(12) United States Patent
Dasika et al.

(10) Patent No.: US 9,037,835 B1
(45) Date of Patent: May 19, 2015

(54) DATA PROCESSING METHOD AND APPARATUS FOR PREFETCHING

(71) Applicant: ARM LIMITED, Cambridge (GB)

(72) Inventors: Ganesh Suryanarayan Dasika, Austin, TX (US); Rune Holm, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/061,842

(22) Filed: Oct. 24, 2013

(51) Int. Cl.
*G06F 9/00* (2006.01)
*G06F 12/08* (2006.01)
*G06F 15/00* (2006.01)

(52) U.S. Cl.
CPC .................. *G06F 12/0862* (2013.01)

(58) Field of Classification Search
CPC .................. G06F 9/00; G06F 15/00
USPC .................. 712/205–207, 222, 237
See application file for complete search history.

(56) References Cited

U.S. PATENT DOCUMENTS

| | | | |
|---|---|---|---|
| 5,390,352 A * | 2/1995 | Kinoshita | 712/7 |
| 5,761,706 A | 6/1998 | Kessler et al. | |
| 5,854,921 A * | 12/1998 | Pickett | 712/239 |
| 6,189,094 B1 * | 2/2001 | Hinds et al. | 712/222 |
| 6,216,219 B1 * | 4/2001 | Cai et al. | 712/207 |
| 6,571,318 B1 | 5/2003 | Sander et al. | |
| 7,657,729 B2 * | 2/2010 | El-Essawy et al. | 712/240 |
| 2003/0225977 A1 | 12/2003 | Desai et al. | |
| 2004/0186980 A1 * | 9/2004 | Ansari | 712/4 |
| 2013/0185516 A1 | 7/2013 | Sassone et al. | |
| 2014/0258696 A1 * | 9/2014 | Srikantaiah | 712/239 |
| 2014/0359221 A1 * | 12/2014 | Kalamatianos et al. | 711/122 |

OTHER PUBLICATIONS

Woo et al., "Compass: A Programmable Data Prefetcher Using Idle GPU Shaders", *School of Electrical and Computer Engineering, Georgia Institute of Technology*, (No Date), 13 pgs.
Chen et al., "An Adaptive Data Prefetcher for High-Performance Processors", *Department of Computer Science, Illinois Institute of Technology*, (No Date), 10 pgs.
Lee et al., "Many-Thread Aware Prefetching Mechanisms for GPGPU Applications", *IEEE/ACM International Symposium on Microarchitecture (Micro)*, Dec. 2010, pp. 1-12.
Jog et al., "Orchestrated Scheduling and Prefetching for GPGPUs", (No Date), pp. 1-12.
UK Search Report dated Mar. 19, 2015 in GB 1416384.4, 3 pages.

* cited by examiner

*Primary Examiner* — Christopher Shin
(74) *Attorney, Agent, or Firm* — Nixon & Vanderhye P.C.

(57) ABSTRACT

A data processing device includes processing circuitry 20 for executing a first memory access instruction to a first address of a memory device 40 and a second memory access instruction to a second address of the memory device 40, the first address being different from the second address. The data processing device also includes prefetching circuitry 30 for prefetching data from the memory device 40 based on a stride length 70 and instruction analysis circuitry 50 for determining a difference between the first address and the second address. Stride refining circuitry 60 is also provided to refine the stride length based on factors of the stride length and factors of the difference calculated by the instruction analysis circuitry 50.

15 Claims, 4 Drawing Sheets

|  | T#0 | T#1 | T#2 | T#3 |
|---|---|---|---|---|
| EXECUTION ORDER | 3 | 1 | 4 | 2 |
| R9 | 150 | 100 | 170 | 140 |
| DIFFERENCE | 10 | INVALID | 20 | 40 |
| STRIDE LENGTH | 10 | INVALID | 10 | 40 |

INST = LDR r8 [r9]

FIG. 2

|                  | T#0  | T#1  | T#2  | T#3     |
|------------------|------|------|------|---------|
| EXECUTION ORDER  | 2    | 4    | 3    | 1       |
| R9               | 155  | 191  | 182  | 200     |
| DIFFERENCE       | -45  | 9    | 27   | INVALID |
| STRIDE LENGTH    | -45  | 9    | 9    | INVALID |
| CONFIDENCE       | 0    | 1    | 0    | 0       |

INST = LDR r8 [r9]

FIG. 3

DATA PROCESSING METHOD AND APPARATUS FOR PREFETCHING

BACKGROUND OF THE INVENTION

1. Field of the Invention

This invention relates to the field of data processing. More particularly, the present invention relates to prefetching in a data processing apparatus.

2. Description of the Prior Art

In a data processing apparatus comprising processing circuitry and a memory, it may be time consuming for the processing circuitry to execute a memory access instruction. In particular, the processing circuitry must send a request to a memory device to access a particular memory address and retrieve the data located at that address. The memory device must then access the memory, retrieve the requested data and then forward the requested data back to the processing circuitry. This may take several processing cycles to occur, during which the processing circuitry may be paused or unable to proceed further. If the processing circuitry executes a number of memory access instructions, then the processing circuitry may be delayed by a period of time while the memory access instructions are handled. In order to help alleviate this problem, the data processing circuitry may use what is known as prefetching, in which a prediction is made regarding which memory addresses are most likely to next be requested. Data at those memory addresses is then fetched before being explicitly requested and the fetching may be carried out when parts of the system are otherwise unoccupied. Accordingly, if those memory addresses are subsequently requested, it may be possible for the processing circuitry to obtain the necessary data more quickly than if no prefetching had taken place. The need for the processing circuitry to pause while requested data is accessed may be reduced, thereby leading to an increased efficiency of the processing circuitry.

The prediction may use the principle of spatial locality. That is, if a thread accesses a particular memory address location, then it is likely that the same thread will issue a subsequent memory access instruction to a nearby memory address. One particular example of this is when a thread accesses a number of data elements, each occupying a fixed length, in an array. By examining the memory addresses to which two or more memory access instructions are issued, it may be possible to deduce a pattern in the memory addresses being requested. For example, given two memory addresses, it may be possible to determine a stride length, which represents the difference in memory address between two adjacent data elements. It may be logical to assume, therefore, that a future memory access instruction will be directed to the next adjacent data element, whose address is the sum of the previously accessed memory address and the stride length.

It will be appreciated that known prefetching approaches rely on memory being accessed in a predictable manner or pattern. If an insufficient number of memory access instructions are issued, for example in the case of a short-lived thread, or if memory access instructions are issued in a complicated or unpredictable manner, it may be impossible or very difficult to properly perform prefetching.

SUMMARY OF INVENTION

In accordance with one aspect, the present invention provides a data processing device comprising: processing circuitry configured to execute a first memory access instruction to a first address of a memory device and a second memory access instruction to a second address of said memory device, wherein said first address is different from said second address; prefetching circuitry configured to prefetch data from said memory device in dependence on a stride length; instruction analysis circuitry configured to determine a difference between said first address and said second address; stride refining circuitry configured to refine said stride length based on factors of said stride length and factors of said difference.

The processing circuitry executes a number of memory access instructions comprising a first memory access instruction and a second memory access instruction. Each memory access instruction is to a particular address of a memory device, with the first memory access instruction being to a first address and the second memory access instruction being to a second address, which is different from the first address. The instruction analysis circuitry analyses the memory access instructions in order to determine a difference between the addresses to which the memory access instructions are directed. The difference may be non-absolute, i.e. the difference may be positive or negative, indicating whether the first address is smaller or larger than the second address, respectively. The analysis may take place by the instruction analysis circuitry monitoring memory access instructions as they are sent from the processing circuitry to the memory device, or may take place by the processing circuitry explicitly notifying the processing circuitry of the memory access instructions. Prefetching circuitry is provided in order to perform the prefetching of data from the memory device based on a stride length. For example, given a stride length and a previous memory access instruction, the prefetching circuitry may be configured to retrieve data from the memory device held at an address of the sum of the address of the previous memory access instruction and the stride length. Stride refining circuitry is configured to refine the stride length based on factors of the stride length and factors of the difference calculated by the instruction analysis circuitry. That is, once a stride length has been determined, the stride refining circuitry may use the difference calculated by the instruction analysis circuitry to produce a new stride length. The refinement is carried out based on factors of the difference and factors of the current stride length. Here, the 'factor' of a number is an integer that, when multiplied by another integer, gives that number.

In accordance with the above, it may be possible to perform prefetching, even when memory addresses are accessed in a complicated pattern. For example, if members of an array are accessed in a non-sequential order. The system may initially determine a stride length that is a multiple of the "true" stride length. However, the refinement circuitry may make it possible to determine the true stride length over a period of time through one or more refinements. For example, if members of an array are accessed in a random manner, then the difference in memory address location of two successive memory access instructions may be taken to be the stride length. However, such a difference may vary considerably between pairs of successive memory access instruction. Known prefetching systems may therefore struggle to determine a stride length, since the difference in memory address between each pair of successive instructions may continually vary. By providing the stride refining circuitry that refines the stride length based on factors of the stride length (i.e. the current stride length) and factors of a difference between two memory access instructions, it may be possible to deduce the true stride length, i.e. in the current example, the difference in memory address between two adjacent members of the array. The prefetching circuitry may thereby prefetch data that is more likely to be requested by the processing circuitry, and consequently improve efficiency of the system.

The processing circuitry may be configured to execute a first thread comprising the first memory access instruction and a second thread comprising the second memory access instruction. The data processing apparatus may therefore be able to determine the stride length, even though memory access requests occur across two or more threads, which may themselves be short-lived. Prefetching may then be carried out for either of those threads, or even for other threads, regardless of how short-lived are those particular threads. Such a scenario may occur in a SIMT (single instruction multiple threads) system in which a number of threads each execute substantially the same, possibly short, piece of code in parallel. The processing circuitry may be able to execute the first thread and the second thread in either order. Accordingly, regardless of the order in which the threads are executed, a stride length may still be deduced that will enable the prefetching circuitry to prefetch relevant data from the memory device that will subsequently be requested.

The first memory access instruction and the second memory access instruction may have the same program counter value. Accordingly, a stride value may be calculated in respect of a particular instruction, thereby making it more likely that multiple related data elements are being accessed. The multiple data elements may be accessed iteratively through a loop, or through each thread accessing a different element and performing the same operation on that element. It will also be appreciated that the prefetch circuitry may maintain a number of different stride lengths and calculate a number of differences, each being directed towards a particular instruction, as identified by the program counter value of that instruction.

The stride refining circuitry may be configured to refine the stride length to a greatest common factor of the stride length and the difference. That is, given a stride length and a difference between memory addresses of a first memory access instruction and a second memory access instruction, the stride refining circuitry will update the stride length to being the greatest common factor of the previous stride length and the difference calculated by the instruction analysis circuitry. The greatest common factor (also known as the greatest common divisor or highest common factor) of two numbers is the largest positive integer that divides those numbers without there being any remainder. For example, if the stride length is 50 and the difference between two memory access instructions is 48, then the greatest common factor is 2. It will be appreciated by the skilled person that there are a number of ways of calculating the greatest common factor, including via Euclid's algorithm. Other techniques for calculating the greatest common factor are also known for use in binary using a combination of subtraction and division by two.

Calculating the greatest common factor between two values can be computationally expensive. Another way of refining the stride length is to instead consider whether the difference between two memory access instructions is a factor of the stride length and, if so, to update the stride length to the difference. Determining whether one number is a factor of another number may be less computationally intensive than determining the greatest common factor of two numbers, and therefore such an approach may be preferable in certain situations. In this way, it may be possible to converge on the greatest common factor after a number of refinements have been made, each at a lower computational cost.

Stride confidence circuitry may be provided in order to maintain a confidence value associated with the stride value. A confidence value may be increased in response to memory access instructions being directed towards an address of data that has already been prefetched by the prefetch circuitry, since this may indicate that the correct data has been prefetched. Furthermore, the stride confidence circuitry may reset the confidence value in response to the stride refining circuitry refining the stride length, to represent the fact that the new stride length has not been tested. In this manner, it may be possible to provide an indication of the likelihood that the stride value represents the true stride length. For example, the confidence value may represent the likelihood that the stride value represented the distance between adjacent data elements of an array that is being accessed by one or more threads executing on the processing circuitry. The prefetching circuitry may be configured to prefetch data in further dependence on the confidence value. For example, the prefetching circuitry may be configured to not prefetch data until such time as the confidence value exceeds some threshold. Alternatively, an amount of data may be prefetched based on the confidence value. For example, the prefetching circuitry may prefetch larger amounts of data if the confidence value is high, but prefetch smaller amounts of data when the confidence value to reduce the possibility of prefetching data that will not be requested.

Such confidence values, if used, may be reduced by the stride confidence circuitry in response to at least one of: a ratio of the difference to the stride length being greater than a first predetermined value, and a ratio of the difference to the stride length being less than a second predetermined value. Accordingly, if the difference calculated by the instruction analysis circuitry indicates that the stride length should change significantly relative to the current stride length, then this may be indicative of the fact that the current stride length is not accurate and therefore the confidence value should be reduced. For example, the first predetermined value may be 16 and the second predetermined value may be −16. Therefore, if the ratio of the difference to the stride length is greater than 16 or less than −16, then the confidence value may be reduced. In other embodiments, the stride confidence circuitry may consider an absolute difference. That is, if the difference value is negative, it is multiplied by −1 to produce an absolute difference between two memory addresses in two memory access instructions which is then compared to a single predetermined value. The first predetermined value and second predetermined value may be dependent on a number of threads that the processing circuitry is configured to execute. For example, if the number of threads being executed by the processing circuitry is particularly high, then the first predetermined value and the second predetermined value may converge towards zero. For example, the first predetermined value may reduce to 8 and the second predetermined value may increase to −8. Since the number of threads that execute on a system may be indicative of the number of memory accesses that are made using a particular instruction, the range of memory addresses that may be accessed in relation to that instruction may be a function of the number of threads that execute on the system. Consequently, it may be possible to provide a more accurate estimate of an appropriate first and second predetermined value based on the number of threads.

The prefetch circuitry may be configured to prefetch data between the first address and the second address in addition to data that is not between the first address and the second address. For example, given a first memory access instruction to a first address and a second memory access instruction to a second address, it may be deduced that it is likely that further memory access instructions will be to addresses between the first address and the second address. Accordingly, the prefetching circuitry may prefetch data between those two addresses in addition to data that is not between those two addresses.

In accordance with a second aspect of the invention there is provided a method of prefetching data from a memory device, comprising the steps: executing a first memory access instruction to a first address of a memory device and a second memory access instruction to a second address of said memory device, wherein said first address is different from said second address; determining a difference between said first address and said second address; refining a stride length based on factors of said stride length and factors of said difference; prefetching data from said memory device in dependence on said stride length.

In accordance with a third aspect of the invention there is provided a data processing device comprising: processing means for executing a first memory access instruction to a first address of a memory device and a second memory access instruction to a second address of said memory device, wherein said first address is different from said second address; prefetching means for prefetching data from said memory device in dependence on a stride length; instruction analysis means for determining a difference between said first address and said second address; stride refining means for refining said stride length based on factors of said stride length and factors of said difference.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows a first example calculation of the difference and refinement of the stride length;

FIG. 3 shows a second example calculation of the difference and refinement of the stride length as well as a determination of a confidence value.

DESCRIPTION OF THE EMBODIMENTS

Figure 1:
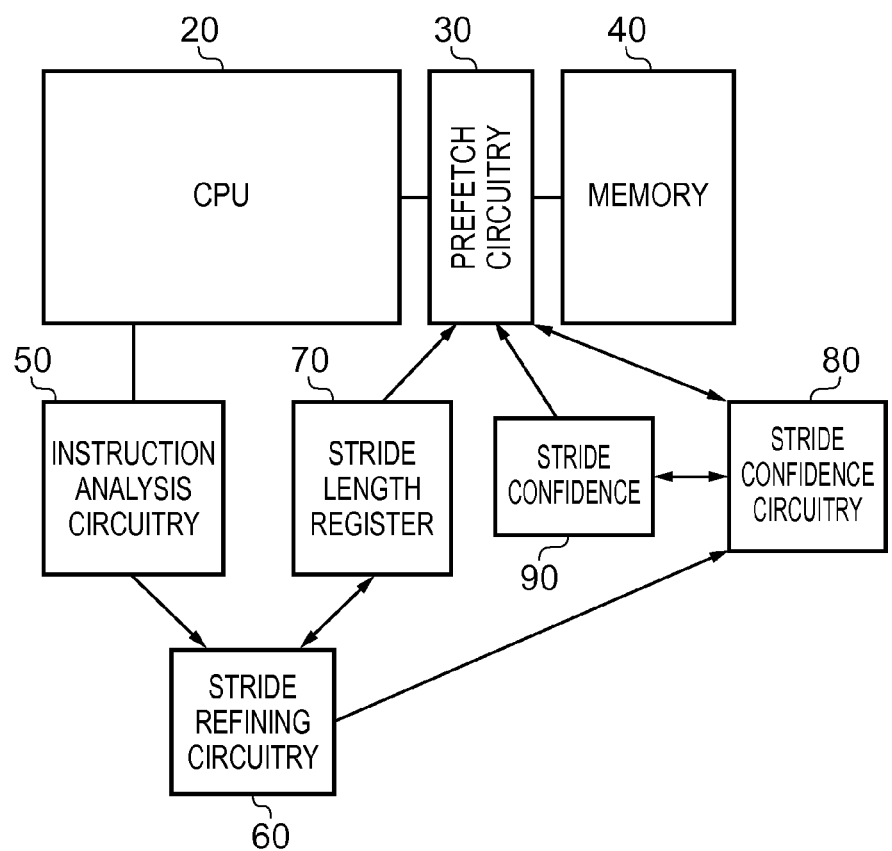
FIG. 1 schematically shows a data processing apparatus in accordance with one example embodiment.

In FIG. 1, the CPU 20 (which is an example of processing circuitry) executes instructions originating from one or more threads. Some of the instructions are memory access instructions, each of which is directed towards a memory device 40. Each memory access instruction is directed towards a particular address of the memory device 40, and causes data to be retrieved from that address and returned to the CPU 20 for processing. Prefetching circuitry 30 is provided in order to fetch data from the memory device 40 that has not been explicitly requested by the CPU 20. By anticipating the future needs, i.e. future memory access instructions of the CPU 20, the prefetch circuitry 30 can pre-emptively fetch data from the memory device 40. By requesting data before the CPU 20 issues a memory access instruction to the memory device 40 for that data, the prefetch circuitry 30 can reduce the delay experienced by the CPU 20 when processing a memory access instruction to that data.

The future needs of the CPU 20 are anticipated by the prefetch circuitry 30 by means of a stride length stored within a stride length register 70. That is, the prefetch circuitry 30 pre-emptively prefetches data from the memory device 40 based on the most recently issued memory access instruction and the stride length. Accordingly, the efficiency of the system as a whole may be improved by eliminating or reducing the delay experienced as a result of memory access instructions.

Instruction analysis circuitry 50 is provided in order to analyse the addresses to which the memory access instructions are directed. The instruction analysis circuitry 50 may be capable of monitoring memory access instructions issued by the CPU 20. Alternatively, the CPU 20 may explicitly notify the instruction analysis circuitry 50 of memory access instructions that are being executed. In this way, the instruction analysis circuitry 50 is aware of the memory access instructions being issued by the CPU 20 to the memory device 40 and can therefore analyse the addresses of the memory access instructions to determine a difference between those addresses.

The difference may be calculated by performing a subtraction of the first address from the second address. The difference may be positive, indicating that the second address is bigger than the first address and therefore that the memory device 40 may be being accessed in a "forwards direction" or an increasing manner. The difference may also be negative, indicating that the second address is smaller than the first address and therefore that the memory device 40 may be being accessed in a "backwards direction" or decreasing manner. Of course, it will be appreciated by the skilled person that the present invention is not limited to systems having such a memory addressing scheme and that other schemes may work equally as well.

The stride refining circuitry 60 uses this difference to refine the stride length held in the stride length register 70. In this embodiment, the stride refining circuitry 60 updates the stride length such that the new stride length is the difference calculated by the instruction analysis circuitry 50 if that difference is a factor of the current stride length. For example, if the current stride length was 20 and the difference calculated by the instruction analysis circuitry 50 was 10, then the stride length 70 would be updated to 10. Alternatively, if the current stride length held in the stride length register 70 was 15 and the difference calculated by the instruction analysis circuitry 50 was 12 then the stride length would remain at 15, because 12 is not a factor of 15. It will be appreciated that in other embodiments, other techniques may be used for updating the stride length based on factors of the stride length and factors of the difference calculated by the instruction analysis circuitry 50. For example, the stride length may be updated to the greatest common factor of the stride length and the difference calculated by the instruction analysis circuitry 50.

Stride confidence circuitry 80 is also provided in order to maintain a stride confidence value 90. The stride confidence circuitry 80 updates the stride confidence value 90 in response to a new stride length being specified by the stride refining circuitry 60. Furthermore, the stride confidence circuitry 80 is configured to increase the stride confidence value 90 in response to the CPU 20 issuing memory access instructions for data that has already been prefetched by the prefetch circuitry 30. Accordingly, in response to the prefetch circuitry 30 correctly prefetching data on the basis of the stride length held in the stride length register 70, the stride confidence value 90 is increased to indicate that the confidence in the stride length held in the stride length register 70 is good. The stride confidence circuitry 80 is also configured to decrease the stride confidence value 90 in response to the stride refining circuitry 60 indicating that a ratio between the difference calculated by the instruction analysis circuitry 50 and the stride length held in the stride length register 70 is above a first predetermined value (e.g. 16) or below a second predetermined value (i.e. −16). For example, if the stride length held in the stride length register 70 is 2 and the instruction analysis circuitry 50 reports a difference of 100, then the ratio would be 50 (100/2), which is above the example first predetermined value of 16, and would cause the stride confidence circuitry 80 to reduce the stride confidence value 90. Similarly, if the instruction analysis circuitry 50 were to report a difference of −100, this would result in a ratio of −50 (−100/2), which is below the example second predetermined value of −16 and will again cause the stride confidence value 90 to be reduced.

As previously mentioned, the prefetch circuitry 30 pre-emptively fetches data from the memory 40 based on stride length held in the stride length register 70. The prefetch circuitry 30 also pre-emptively fetches data from the memory device 40 in dependence on the stride confidence value 90. That is, if the stride confidence value 90 is low, then the prefetch circuitry 30 may not prefetch any data from the memory 40 or may only prefetch a small amount of data. However, if the stride confidence value 90 is high, the prefetch circuitry 30 may pre-emptively fetch a large quantity of data from the memory 40.

FIG. 2 shows a first example of determining a difference and a stride length, and of refining or updating the stride length. A number of threads labelled T#0, T#1, T#2, and T#3 execute in parallel on a CPU or processing circuitry 20. The skilled person will appreciate that the threads may be executed by the CPU or processing circuitry 20 in any order. However, in this example, the order in which the threads are executed is shown in the row marked "execution order". That is, the threads execute in the order T#1, T#3, T#0, and T#2. Each of the four threads execute substantially the same code and in particular, each of the four threads executes the instruction shown at the bottom of FIG. 2 ("LDR r8 [r9]"). This instruction represents a memory access instruction in which the memory address stored in register R9 is accessed and the data at that memory address is stored in register R8. In this embodiment, the program counter is used to determine that each of the four threads is executing substantially the same instruction. Since substantially the same instruction is being executed, it is possible to determine a stride length between memory addresses being accessed in the memory access instructions and consequently, the prefetch circuitry 30 can be used to determine the "true" stride length. The stride length is initially set to zero to indicate that no stride length has been determined.

When thread T#1 executes, the memory access instruction is directed to memory address 100. However, since two memory access instructions have not been issued in respect of this instruction, it is not possible to determine a difference and so no refinement of the stride length can take place.

Next, thread T#3 executes and issues a memory access instruction towards memory address 140. Accordingly, the instruction analysis circuitry 50 calculates the difference between memory address 100 (the previous memory access instruction) and memory address 140 (the current memory access instruction) as 40, which is marked in the "difference" row. Since the stride length was previously marked as invalid or undefined, indicating that no stride length had previously been determined, the stride length is simply updated to match the difference and hence the stride length also becomes 40.

When thread T#0 executes, it sends a memory access instruction towards memory address 150. The difference between this address and the previous address (140) is 10 as indicated in the "difference" row. This difference is a factor of the stride length, 40. Accordingly, the stride length is updated to being the difference that has just been calculated, and so the stride length becomes 10.

Next, when thread T#2 executes, it sends a memory access instruction to memory address 170. The difference between this memory address and the previously accessed memory address (150) is 20. However, 20 is not a factor of the previous stride length (10) and so the stride length is unchanged and remains at 10.

Accordingly, it can be seen that the stride length has been refined from 40 to 10, which is the data processing apparatus' current prediction of the "true" stride length. During and after execution of these threads, the prefetch circuitry 30 may prefetch data from the memory 40. It may be logical to conclude, after execution of threads T#0-T#3, that since the stride length is 10 and since memory address 100 and memory address 170 have both been accessed, future memory access instructions will be directed towards memory addresses 120, 130, 140, 150, and 160. Consequently, the prefetch unit may now prefetch data at those addresses. Furthermore, threads may also access memory addresses that are a multiple of 10 below memory address 100 or above memory address 170. Of course, the skilled person will appreciate that if other threads executing this instruction attempt to access memory locations at a finer granularity that the stride length of 10, for example if a hypothetical thread T#4 were to issue a memory access instruction to a memory address 175, then this would indicate a difference of 5 (175−170) and the stride length would be further refined. Such a situation would not necessarily invalidate the prefetching that had already been carried out, but may indicate that more data was to be prefetched between memory address 100 and memory address 170, e.g. at addresses 125, 135, 145, etc.

FIG. 3 shows a second example of refining a stride length using a greatest common factor. Furthermore, FIG. 3 shows the use of a confidence value. Four threads are again executed on a processing circuitry 20 such as a CPU. In this instance, the threads execute in the order T#3, T#0, T#2, and T#1. Each of the four threads executes substantially the same code and for the purposes of this example, the effect of executing the instruction "LDR r8 [r9]" is examined. In this example, the difference and the stride length are initially invalid/undefined and the confidence score is initially zero.

When thread T#3 executes, it issues a memory access instruction to memory address 200. Since there has not been a pair of memory access instructions executed in respect of this instruction, it is not possible to determine a difference and therefore the stride length and the difference both remain undefined.

When thread T#0 executes, it issues a memory access instruction to memory address 155, which represents a difference of −45 from the previous memory access instruction that was directed towards memory address 200. Since the stride length is currently invalid/undefined, the stride length is updated to being equal to the difference. Furthermore, the confidence value is reset to zero, since the stride length has changed. In this example, since the confidence value is already zero, there is no observable change.

When thread T#2 executes, it sends a memory access instruction towards memory address 182, providing a difference of 27 (182−155). Since a difference and a stride length have both been defined, it is possible to attempt to refine the stride length. The greatest common factor of −45 and 27 is 9. Accordingly, the stride length is refined to 9 and the confidence value is reset to zero.

When thread T#1 executes, it sends a memory access instruction towards memory address 191. The difference is therefore calculated as 9 (191−182). Since the difference is already equal to the stride length, no refinement takes place.

It is assumed in this example, that the data at memory address 191 has already been prefetched at the time that it is requested by thread T#1. Accordingly, since a memory access instruction has been issued towards a memory address that has been prefetched, the confidence value is increased by one, as shown in the "confidence" row in FIG. 3.

Figure 4:
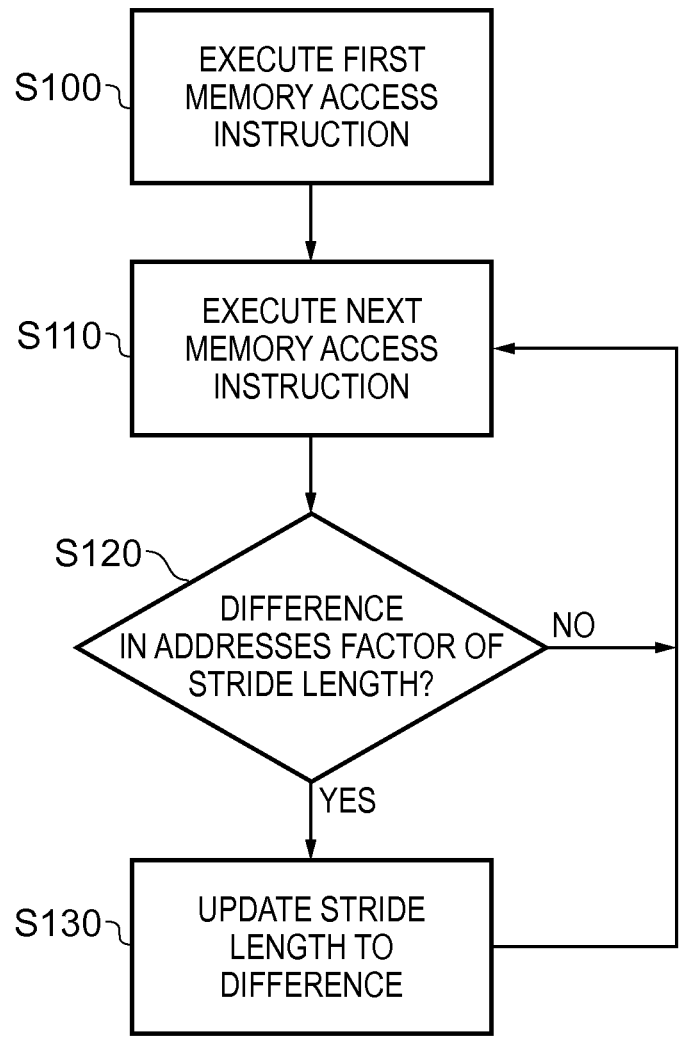
FIG. 4 shows a flowchart illustrating a method of determining the stride length.

FIG. 4 shows a flowchart illustrating a method of determining and refining a stride length for prefetch circuitry. At step S100, a first memory access instruction is executed. At step S110 a next memory access instruction is executed. At step S120, a difference in the addresses used for the most recent two memory access instructions is calculated and it is determined whether this difference is a factor of the current stride length or not. If the difference is not a factor of the stride length then the process returns to step S110 where the next memory access instruction is executed. Alternatively, the process continues to step S130 where the stride length is updated to the difference and the process then returns to step S110. In parallel with the refinement process shown in FIG. 4, prefetching circuitry may use the stride length to perform a prefetching.

Although particular embodiments are being described herein, it will be appreciated that the invention is not limited thereto and that many modifications and additions thereto may be made in the scope of the invention. For example, various combinations of the features of the following dependent claims could be made with the features of the independent claims without departing from the scope present invention.

We claim:

1. A data processing device comprising:
    processing circuitry configured to execute a first memory access instruction to a first address of a memory device and a second memory access instruction to a second address of said memory device, wherein said first address is different from said second address;
    prefetching circuitry configured to prefetch data from said memory device in dependence on a stride length;
    instruction analysis circuitry configured to determine a difference between said first address and said second address;
    stride refining circuitry configured to refine said stride length based on factors of said stride length and factors of said difference.

2. A data processing device according to claim 1, wherein said processing circuitry is configured to execute a first thread comprising said first memory access instruction and a second thread comprising said second memory access instruction.

3. A data processing device according to claim 1, wherein said first memory access instruction and said second memory access instruction have the same program counter value.

4. A data processing device according to claim 2, wherein said processing circuitry is configured to execute said first thread and said second thread in either order.

5. A data processing device according to claim 1, wherein said stride refining circuitry is configured to refine said stride length to a greatest common factor of said stride length and said difference.

6. A data processing device according to claim 1, wherein said stride refining circuitry is configured to refine said stride length to said difference if said difference is a factor of said stride length.

7. A data processing device according to claim 1, comprising:
    stride confidence circuitry, configured to maintain a confidence value of said stride value, to increase said confidence value in response to a memory access instruction directed towards an address of data that has been prefetched by said prefetching unit, and to reset said confidence value in response to said stride refining circuitry refining said stride length.

8. A data processing device according to claim 7, wherein said prefetching circuitry is configured to prefetch data in further dependence on said confidence value.

9. A data processing device according to claim 7, wherein said stride confidence circuitry is configured, in response to at least one of:
    a ratio of said difference to said stride length being greater than a first predetermined value; and
    a ratio of said difference to said stride length being less than a second predetermined value,
to reduce said confidence value.

10. A data processing device according to claim 9, wherein said first predetermined value is 16.

11. A data processing device according to claim 9, wherein said second predetermined value is −16.

12. A data processing device according to claim 9, wherein at least one of said first predetermined value and said second predetermined value is dependent on a number of threads that said processing circuitry is configured to execute.

13. A data processing device according to claim 1, wherein said prefetching circuitry is configured to prefetch data between said first address and said second address in addition to data not between said first address and said second address.

14. A method of prefetching data from a memory device, comprising the steps:
    executing a first memory access instruction to a first address of a memory device and a second memory access instruction to a second address of said memory device, wherein said first address is different from said second address;
    determining a difference between said first address and said second address;
    refining a stride length based on factors of said stride length and factors of said difference;
    prefetching data from said memory device in dependence on said stride length.

15. A data processing device comprising:
    processing means for executing a first memory access instruction to a first address of a memory device and a second memory access instruction to a second address of said memory device, wherein said first address is different from said second address;
    prefetching means for prefetching data from said memory device in dependence on a stride length;
    instruction analysis means for determining a difference between said first address and said second address;
    stride refining means for refining said stride length based on factors of said stride length and factors of said difference.

* * * * *